Jan. 27, 1953 H. McDOWELL 2,626,634
GAS DISTRIBUTOR FOR STOVES
Filed July 21, 1950 2 SHEETS—SHEET 1
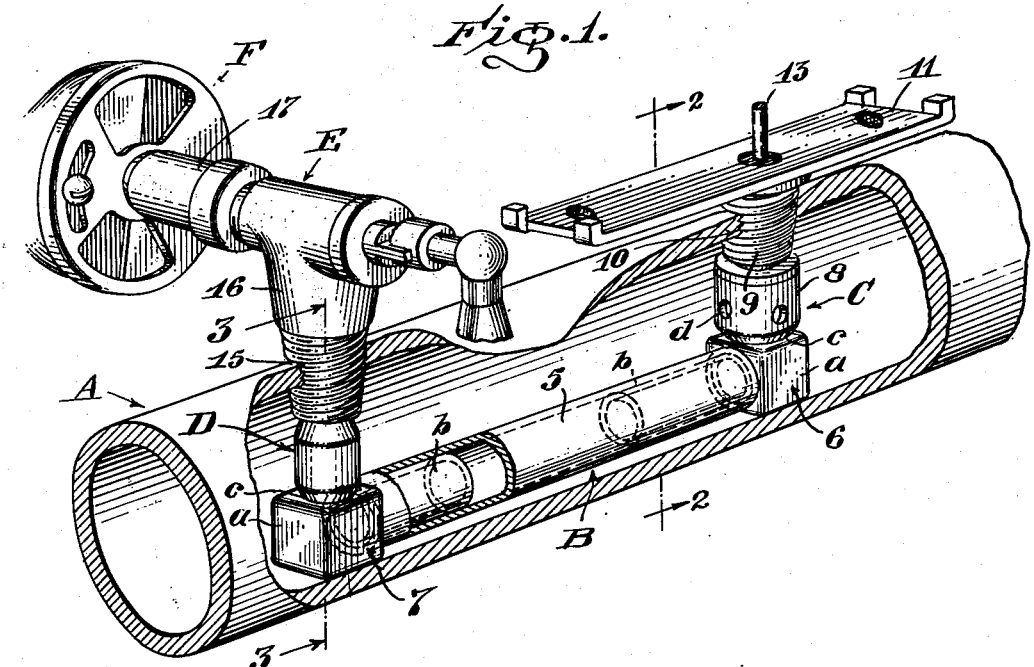
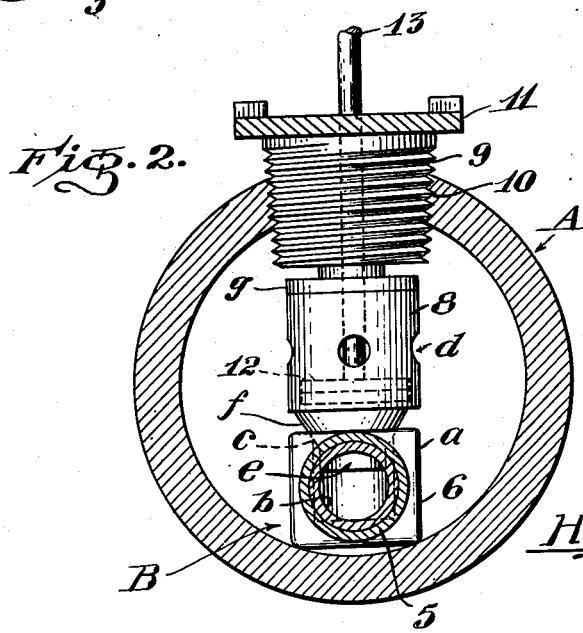
Inventor
Hugh McDowell
BY
R. L. Berry
Attorney.

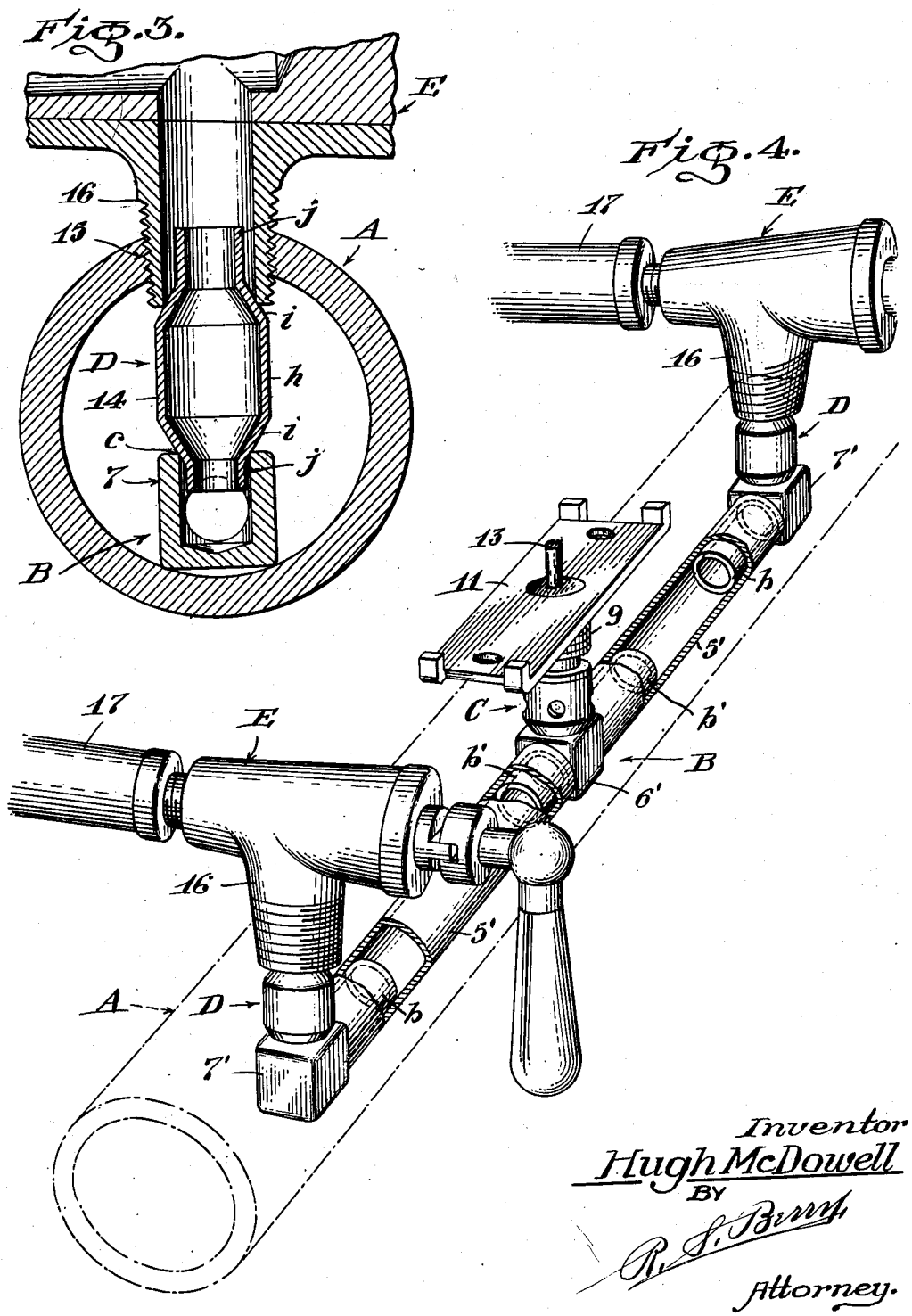

UNITED STATES PATENT OFFICE 2,626,634

GAS DISTRIBUTOR FOR STOVES

Hugh McDowell, Los Angeles, Calif.

Application July 21, 1950, Serial No. 175,047

9 Claims. (Cl. 137—608)

This invention relates to a gas distributor for stoves and has as its primary object the provision of a gas conducting manifold with an elongated internal tubular gas discharger having a valve controlled inlet in communication with the interior of the manifold and also having an outlet leading through the wall of the manifold to a regulating valve, whereby gas under pressure contained in the manifold may be directed under valve control from an intake point within the manifold to a discharge point spaced longitudinally of the manifold from the intake point and leading laterally from the manifold exteriorly thereof without interfering with the function of the manifold in feeding gas to other points of discharge in regular service.

Another object is to provide a gas conducting manifold with an internal auxiliary discharge tube which is especially applicable for use in the controlled delivery of gas to the burner or burners of a gas stove, range or the like, and which is suitable for use in connection with the gas control device set forth in my co-pending application for Letters Patent Serial No. 170,142 filed June 24, 1950, to obviate an external by-pass attachment to a gas feeding manifold as therein set forth, whereby the manifold structure is rendered more compact and free of the objectionable space consuming protuberance afforded by such external by-pass.

A particular object is to provide connections whereby the assemblage within the manifold of the auxiliary fluid discharge tube with its associated intake valve may be readily accomplished and in a manner to insure against leakage of fluid from the manifold through such connections.

Another object is to provide a fluid conduit with an independent attached demountable internal conduit fitted with a valve controlled inlet communicating with the interior of the fluid conduit and which is adapted to have one or more outlets fitted with connections leading to the exterior of the fluid conduit adapted to deliver fluid from the latter through said valve controlled inlet to one or more points of discharge along the length of the conduit.

Another object is to provide a simple and yet effective mode of assembling within a conduit, at a point remote from the ends thereof, a length of auxiliary discharge tubing having a valve equipped inlet connecting with the interior of the conduit controllable from the exterior thereof and also having an outlet leading through the wall of the conduit.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a manifold with portions broken away showing it as equipped with an attached valve controlled internal fluid discharge tube having a single outlet leading through the manifold wall to a regulating valve connecting with a burner intake;

Fig. 2 is a cross section and elevation as seen on the line 2—2 of Fig. 1 showing the valve controlled intake of the internal discharge tube;

Fig. 3 is a view in section taken on the line 3—3 of Fig. 1 depicting the outlet portion of the internal discharge tube; and Fig. 4 is a perspective view with portions broken away illustrating the internal discharge tube as provided with a plurality of outlets.

Referring to the drawings more specifically A indicates a tubular gas conducting manifold which as here shown comprises the usual length of iron pipe with which gas stoves are commonly equipped as a means for delivering gas from a source of supply to regulating valves connecting with gas burners with which the stove is equipped, and B designates generally the auxiliary internal gas discharge attachment with which the manifold is provided in carrying out the invention.

The attachment B embodies a metal tube 5 of any suitable length which is arranged within the manifold intermediate its ends in a selected position; the tube 5 having an outside diameter considerably less than the inside diameter of the manifold to permit its ready insertion longitudinally in the latter and to afford requisite space for end connections C and D leading transversely of the manifold.

The ends of the tube 5 are provided with fittings 6 and 7 each of which embodies a hollow block-like body $a$ having a cylindrical nipple $b$ leading from a side thereof which nipple is telescopically and snugly fitted in the adjacent end of the tube 5 in rigid engagement therewith. A circular opening $c$ is formed in the top wall of the body $a$ of each fitting 6—7 which openings are presented upwardly when the tube 5 is seated within the manifold A.

The connection C embodies a valve having a cylindrical housing 8 formed with a series of side inlet ports $d$ opening to the interior of the manifold A, and also having a tubular end outlet

*e* communicating with the ports *d* through the interior of the housing, which outlet is telescopically engaged in the opening *c* of the fitting 6; the housing 8 having a conical end portion *f* which extends into the opening *c* and tightly seats on the portion of the coupling 6 forming the margin of the opening *c* to afford a leakproof joint between the valve connection C and the fitting 6.

The valve housing is provided with a cap *g* which is presented to and is abutted by a tapered screw threaded plug 9 screwed in a threaded opening 10 formed in the wall of the manifold A at a point opposite that at which the fitting 6 is to be located; the plug 9 being rigidly affixed to a base plate 11 adapted to receive and support a suitable valve operating mechanism (not shown). The opening 10 and the valve housing 8 are relatively dimensioned so that the valve housing may be passed through the opening.

Mounted within the valve housing 8 is a piston valve 12 adapted to be positioned to close the communication between the inlet ports *d* and the outlet *e*; and also to be disposed above the ports *d* to open the valve and permit the flow of gas from the manifold through the ports *d* and outlet *e* into the fitting 6 and tube 5. The valve 12 is fixed on a stem 13 which projects upwardly through the cap *g*, plug 9 and base plate 11, for engagement with any suitable operating means.

The connection D embodies a duct 14 comprising an intermediate tubular cylindrical portion *h* having end tapers *i—i* terminating in cylindrical ends *j—j*. This duct is positioned with one of its ends *j* telescopically extending into the opening *c* of the fitting 7 and with the adjacent taper *i* snugly seating on the portion of the fitting forming the margin of the opening *c*. The other end of the duct 14 projects into an opening 15 formed in the wall of the manifold A at a point opposite the fitting 7. The opening 15 and duct 14 are relatively dimensioned so that the duct may be passed through the opening to position it interiorly of the manifold.

Screwed into the opening 15 is the threaded tapered intake nipple 16 of a conventional gas regulating valve E which nipple loosely encompasses the contiguous cylindrical end *j* of the duct 14 and tightly seats on the adjacent taper *i* in sealed engagement therewith. The discharge end of the regulating valve E is here shown as fitted with a nozzle 17 in the usual manner which nozzle leads into the mixing chamber F of a burner (not shown).

In assembling the parts, the manifold is formed with the threaded openings 10 and 15 at desired points in the length thereof and in predetermined spaced relation to each other. The tube 5 with its end fittings 6 and 7 assembled thereon is formed of a length such that the centers of the openings *c* of the fittings will be spaced apart a distance equal to the distance between the centers of the openings 10 and 15.

The tube and fittings thus formed are inserted in an open end of the manifold A and are positioned with the centers of the openings *c* of the fittings in alignment with the centers of the openings 10 and 15 after which the end of the manifold is closed by a cap or plug closure. The valve connection C is then inserted through the opening 10 of the manifold and positioned with its end outlet *e* extending into the opening *c* of the fitting 6 and with its conical end portion *f* engaging the fitting 6 as before described.

The plug 9 with the associated base plate fixed thereto is screwed in place in the opening 10 and brought to forceably bear against the upper end of the valve connection C such as to firmly press the conical end *f* of the latter in sealed abutting engagement with the fitting 6. The duct 14 comprising the coupling D is then inserted through the opening 15 in the manifold and positioned with one end *j* thereof within the opening *c* of the fitting 7 and with the taper *i* abutting the latter. The nipple 16 of the regulating valve E is then screwed into the opening 15 in encompassing relation to the upper end *j* of the duct 14, and is positioned with the end of the nipple forceably bearing against the adjacent taper *i* of the duct 14 so as to effect sealing seated engagement between the nipple 16 and the duct 14 and between the duct 14 and the fitting 7. An internal conduit will thus be provided in the manifold with one end thereof equipped with a valve controlled inlet afforded by the valve connection C housed within the manifold and with the other end thereof leading laterally and connecting with the intake of a regulating valve arranged exteriorly of the manifold.

In the arrangement above described, in which a single tube 5 is employed as shown in Fig. 1, a single outlet is provided. In this instance the fittings 6 and 7 each constitute elbows. Where it is desired to provide a manifold with a pair of regulating valves to which gas is to be supplied through the valve controlled internal conduit the arrangement shown in Fig. 4 may be employed. In this instance a pair of the tubes 5'—5' are provided in line and fitted at their outer ends with elbow fittings 7' complementary to the fitting 7 while the inner ends of the tubes are connected to a T-fitting 6' similar to the fitting 6 except for the provision of a pair of nipples *b'—b'* leading from opposite sides thereof into engagement with the aligned opposed tubes 5'—5'.

The valve connection C and the duct connections D are applied to the fittings 6' and 7' and connected to a regulating valve E in the same manner as described in connection with the arrangement shown in Fig. 1. Obviously any desired number of regulating valves E may be connected to a single control valve C through aligned tubes 5 by employing T-fittings between adjacent tubes and equipping the outer ends of end tubes with the elbows 7 as will be readily understood.

It will be seen from the foregoing that by the construction set forth, the gas feeding manifold A may be readily equipped with an independent auxiliary internal tubular gas discharger B to afford valve controlled flow or cut-off of gas to one or more regulating valves.

In the operation of the invention the control valve C is normally closed to cut off the supply of gas to the regulating valve or valves connected to the discharger B, but is designed to be held open by a suitable release mechanism, such as a time controlled device as set forth in the application aforesaid and not necessary to be here shown, which on being operated will release the valve and automatically cut off the feed of gas to the discharger B.

I claim:

1. In a gas distributor for gas burning stoves, a tubular gas conducting manifold, an independent gas conducting tube within said manifold having an inlet leading to the interior of the manifold and having a discharge end, a valve controlling said inlet arranged so that it can be actuated exteriorly of the manifold, and separable gas conducting connections leading from the discharge end of said tube to the exterior of said manifold.

2. In a gas distributor for gas burning stoves, a tubular gas conducting manifold, an auxiliary gas conducting tube within said manifold having an inlet leading to the interior of the manifold and having a discharge end, a valve controlling said inlet arranged so that it can be actuated exteriorly of the manifold, a regulating valve, an intake nipple on said valve having an open end extending into said manifold, and gas conducting connections between the discharge end of said tube and the open end of said intake nipple.

3. The structure called for in claim 2 in which the gas conducting connections between the tube and the valve intake nipple comprise a fitting connected to the discharge end of the tube having an opening presented toward the open end of said nipple, and a duct having opposed end portions extending respectively into the opening in said fitting and the open end of said intake nipple in telescopic connection therewith, and means on said duct abutting only the portion of said fitting forming the margin of the opening therein and sealing said opening to the interior of the manifold, and means on said duct abutting said intake nipple sealing the latter to the interior of the manifold.

4. In a gas distributor for gas burning stoves, a tubular gas conducting manifold having a lateral opening, a gas discharge tube within said manifold having an intake end and an outlet end terminating in the manifold, a gas conducting fitting on one end of said tube having an opening presented toward said lateral manifold opening, a valve housing having opposed ends one of which telescopically extends into the opening of said fitting, a plug screwed into the manifold opening bearing against the other end of said valve housing, said valve housing having side intake ports and an end outlet port which latter opens to said fitting, a valve in said housing arranged for positioning between said inlet and outlet ports and operable to open said ports to each other, an operating stem on said valve leading through said plug to the exterior of said manifold, and gas conducting connections on the other end of said tube leading laterally to the exterior of said manifold.

5. In a gas distributor for gas burning stoves, a tubular gas conducting manifold having a lateral opening therein, a regulating valve, a threaded nipple on said valve screwed into said opening having an open end extending into said manifold, an auxiliary gas discharging tube within said manifold having ends terminating in the manifold, a fitting on one end of said tube having an opening presented toward the open end of said nipple, a gas conducting duct having end portions telescopically engaging the open end of said nipple and the opening in said fitting, tapers on the end portions of said duct seating on said nipple and said fitting sealing same to the interior of said manifold, and a valve on the other end of said tube for opening and closing said tube to gas under pressure in said manifold.

6. A gas distributor for gas burning stoves comprising a gas conducting manifold, an auxiliary gas discharge tube within said manifold extending longitudinally thereof having an intake end and a discharge end terminating in the manifold, a valve within the manifold connected to the intake end of said tube for opening and closing said tube intake end to the interior of the manifold, a stem forming part of said valve for actuating it to an open or a closed position, said stem leading exteriorly of said manifold, a regulating valve exteriorly of said manifold having an intake nipple entering said manifold, and a duct connecting the discharge end of said tube to said nipple sealing the latter to the interior of the manifold.

7. A gas distributor for gas burning stoves comprising a tubular manifold for conducting gas under pressure, an elongated gas discharge tube housed within said manifold and extending longitudinally thereof, valve means connected to said tube for directing gas from the interior of said manifold to the interior of said tube operable to open or close said tube to said manifold, said valve means being arranged so as to be operated from the exterior of the manifold, and valve means connected to said manifold and to said tube for regulating the discharge of gas from said tube and so disposed as to be actuatable exteriorly of the manifold.

8. In a gas distributor for gas burning stoves, a gas conducting manifold, an elongated gas discharge tube within said manifold, an elbow fitting engaged with one end of said tube having a lateral opening, a valve housing having an outlet leading into said opening and having inlet ports opening to the interior of the manifold, a valve element in said housing for opening and closing said ports to said outlet, a stem connected to said valve element leading to and operable from the exterior of said manifold, a screw plug threaded in said manifold bearing on said valve housing and holding it in a seated position against said fitting, an elbow fitting engaged with the other end of said tube having a lateral opening, a duct having end portions one of which extend into the opening in said last named fitting, and a threaded nipple screwed into said manifold and bearing against the other end portion of said duct and holding the latter in seated engagement with said fitting.

9. In a gas distributor for gas burning stoves, a gas conducting manifold, aligned gas discharging tubes in said manifold, a T-fitting connecting adjacent ends of said tubes, a valve structure within said manifold connecting with said fitting for admitting or cutting off gas through said fitting to said pair of discharge tubes, means included in said valve structure for actuating it from the exterior of the manifold, a pair of regulating valves, nipples on said valves screwed into said manifold having intake ends extending interiorly of said manifold, elbow fittings on the outer ends of said tubes, and ducts connecting said nipples to said elbow fittings.

HUGH McDOWELL.

REFERENCES CITED

The following references are of record in the file of this patent:

UNITED STATES PATENTS

| Number | Name | Date |
| --- | --- | --- |
| 266,680 | Doolittle | Oct. 31, 1882 |
| 1,118,299 | McNutt | Nov. 24, 1914 |
| 1,372,600 | Campbell | Mar. 22, 1921 |